(12) United States Patent
Jung

(10) Patent No.: US 12,209,351 B2
(45) Date of Patent: Jan. 28, 2025

(54) WASHING MACHINE

(71) Applicant: SAMSUNG ELECTRONICS CO., LTD., Suwon-si (KR)

(72) Inventor: Hyundong Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 396 days.

(21) Appl. No.: 17/698,663

(22) Filed: Mar. 18, 2022

(65) Prior Publication Data

US 2022/0243384 A1 Aug. 4, 2022

Related U.S. Application Data

(63) Continuation of application No. PCT/KR2022/001580, filed on Jan. 28, 2022.

(30) Foreign Application Priority Data

Feb. 4, 2021 (KR) .................. 10-2021-0016117

(51) Int. Cl.
*D06F 39/10* (2006.01)
*B01D 29/05* (2006.01)
*B01D 35/30* (2006.01)

(52) U.S. Cl.
CPC ............ *D06F 39/10* (2013.01); *B01D 29/05* (2013.01); *B01D 35/30* (2013.01); *B01D 2201/302* (2013.01); *B01D 2201/304* (2013.01)

(58) Field of Classification Search
None
See application file for complete search history.

(56) References Cited

U.S. PATENT DOCUMENTS

| 2,936,604 A | 5/1960 | Glendening |
| 2009/0229319 A1* | 9/2009 | Yoo .................. D06F 39/10 |
| | | 68/235 R |

(Continued)

FOREIGN PATENT DOCUMENTS

| CN | 206308502 U | 7/2017 |
| CN | 108442083 A | 8/2018 |

(Continued)

OTHER PUBLICATIONS

KR 20070097849 translation, Coupling for Filter in Washing Machine, Kwak (Year: 2007).*

(Continued)

*Primary Examiner* — Cristi J Tate-Sims
(74) *Attorney, Agent, or Firm* — STAAS & HALSEY LLP

(57) ABSTRACT

A washing machine is includes a tub, a spin basket rotatably disposed inside the tub, a pulsator disposed at a lower portion of the spin basket and configured to generate a flow of washing water, and a filter device including a body including a first side facing away from an inner wall and a second side coupled to the inner wall of the spin basket, that forms a path therein so that the washing water of the flow is introduced into the body, and to which a filter is installable so that when the filter is installed, the washing water introduced into the body is filtered by the filter, a cover covering the first side of the body and forming a portion of an inner circumferential surface of the spin basket, and a sealing member sealing a space between the body and the cover.

16 Claims, 11 Drawing Sheets

(56) References Cited

U.S. PATENT DOCUMENTS

2019/0093277 A1    3/2019  Kim et al.
2019/0161899 A1*   5/2019  Fugal .................... D06F 23/04

FOREIGN PATENT DOCUMENTS

| | | |
|---|---|---|
| JP | 2002-159790 A | 6/2002 |
| JP | 2005-28840 A | 2/2005 |
| KR | 10-2007-0097849 A | 10/2007 |
| KR | 10-1392911 B1 | 5/2014 |
| KR | 10-2017-0123599 A | 11/2017 |
| KR | 10-2019-0005444 A | 1/2019 |

OTHER PUBLICATIONS

International Search Report dated May 16, 2022 in PCT Application No. PCT/KR2022/001580.
Office Action dated Jan. 29, 2024 issued in European Application No. 22749971.2.

* cited by examiner

WASHING MACHINE

CROSS-REFERENCE TO RELATED APPLICATION

This application is a continuation application, under 35 U.S.C. § 111(a), of International Application No. PCT/KR2022/001580, filed on Jan. 28, 2022, which claims priority to Korean Patent Application No. 10-2021-0016117, filed on Feb. 4, 2021, in the Korean Intellectual Property Office, the disclosure of which is incorporated herein by reference.

BACKGROUND

1. Field

Embodiments of the present disclosure relate to a washing machine, and more particularly, to a washing machine including a filter device that prevents mold from being generated.

2. Description of the Related Art

Washing machines are machines that wash clothes using electric power, and generally include a tub configured to store washing water, a spin basket rotatably installed in the tub, and a pulsator rotatably provided at a bottom of the spin basket.

When the spin basket and the pulsator are rotated in a state in which laundry and detergent are put into the spin basket, the pulsator agitates the laundry put into the spin basket with the washing water to remove contaminants from the laundry.

In this process, a filter provided in the washing machine filters out foreign substances contained in the washing water and prevents the foreign substances from being mixed with the laundry again. In addition, the washing machine may include a body in which the filter is accommodated, and a cover provided on an outside of each of the body and the filter to improve corrosion resistance and aesthetic appearance.

However, as the washing machine continues to be used, mold, scale, and the like may be generated between the cover and the body due to the washing water and the foreign substances, and thus there is a need for preventing the generation of the mold and the scale.

SUMMARY

Therefore, it is an aspect of the present disclosure to provide a washing machine capable of preventing mold and scale from being generated between a body and a cover.

In accordance with one aspect of the present disclosure, a washing machine includes a tub, a spin basket rotatably disposed inside the tub, a pulsator disposed at a lower portion of the spin basket and configured to generate a flow of washing water, and a filter device may include a body including a first side facing away from an inner wall and a second side coupled to the inner wall of the spin basket, configured to form a path therein so that the washing water of the flow is introduced into the body, and to which a filter is installable so that when the filter is installed, the washing water introduced into the body is filtered by the filter, a cover covering the first side of the body and forming a portion of an inner circumferential surface of the spin basket, and a sealing member sealing a space between the body and the cover.

The body may further include a body discharge hole formed in the first side of the body, the cover may include a cover discharge hole corresponding to the body discharge hole, and the sealing member may include a hole corresponding to the body discharge hole and the cover discharge hole so that the washing water flowed through the path is discharged into the spin basket through the body discharge hole, the cover discharge hole, and the hole.

The body may include an edge protrusion protruding at least either upward or downward from an edge portion of the body, and the sealing member may include a recessed part recessed inward from an outer periphery of the sealing member so as to correspond to the edge protrusion.

The edge protrusion may include a first edge protrusion protruding upward from a lower edge of the body, and a second edge protrusion protruding downward from an upper edge of the body.

The sealing member may include a coupling protrusion protruding toward the body from an outer periphery of the sealing member so as to be coupled to the body, and the body may include a coupling hole formed to correspond to the coupling protrusion so that the coupling protrusion is inserted into the coupling hole.

The cover may include a forming rib protruding toward the sealing member and forming the cover discharge hole, and the forming rib may be disposed in the hole of the sealing member sealing a space between the cover and the sealing member.

The body may include a protective protrusion forming the body discharge hole and protruding closer to an inside of the spin basket than the cover to protect the cover from clothes.

The body may include first body including the first side, and a second body including the second side coupled to the inner wall, and a second cover disposed between the first body and the second body and covering the second body, the cover may include a first cover to cover the first body, and the sealing member may be a first sealing member sealing a space between the first cover and the first body and a second sealing member sealing a space between the second cover and the second body.

The second sealing member may be injection-molded after the second body is injection-molded or insert-molded.

The second sealing member is injection molded after the second sealing member may be insert-molded, and the second body may include a communication hole through which an injection-molding material which formed the second sealing member flowed so as to be coupled to the second sealing member.

The second body may further include a third side facing the second sealing member, and the injection-molding material which formed the second sealing member flowed from the first side to the second side through the communication hole to couple the second sealing member to the second body.

The second body may include an opening and is coupled to the first body, and the communication hole of the second body may be formed at an outer periphery of the opening of the second body.

The body discharge hole is smaller than the cover discharge hole and the hole of the sealing member.

The hole of the sealing member is larger than the cover discharge hole and the body discharge hole.

The filter device includes an inlet through which the washing water is introduced.

In accordance with another aspect of the present disclosure, a washing machine includes a tub, a spin basket rotatably disposed inside the tub, a pulsator disposed at a lower portion of the spin basket and configured to generate a flow of washing water, a filter device may include, a body including an one side facing away from an inner wall and an other side coupled to the inner wall of the spin basket and, configured to form a path therein so that the washing water of the flow is introduced into the body, and to which a filter is installable so that when the filter is installed, the washing water introduced into the body is filtered by the filter, a cover covering the first side of the body and forming a portion of an inner circumferential surface of the spin basket. The body is injection-molded after the cover is insert-molded.

The cover may include a communication hole through which an injection-molding material which formed the body flowed so as to be coupled to the body.

The cover may include a first side facing an inside of the spin basket and a second side facing a direction opposite to the first side, and the injection-molding material which formed the body flowed from the second side to the first side through the communication hole.

The cover may include a cover discharge hole provided to allow the washing water to be discharged into the spin basket, and the body may include a body discharge hole corresponding to the cover discharge hole to allow the filtered washing water to be discharged into the spin basket, and a protective protrusion forming the body discharge hole and protruding further toward the inside of the spin basket than the cover so that the cover is protected from clothes.

The cover may include a cover discharge hole provided to allow the washing water to be discharged into the spin basket, a cover part having the cover discharge hole formed therein, and bent parts bent at both sides from the cover part to resist the contraction of the body when the body is injection-molded.

The cover may include at least one fixing hole provided in at least one of an upper side and a lower side to be coupled to a mold during insert injection-molding.

The cover may be attached to the mold by being suctioned into the mold during the insert injection-molding.

In accordance with still another aspect of the present disclosure, a washing machine includes a tub, a spin basket provided in the tub so that clothes are accommodated therein, a pulsator provided at a lower portion of the spin basket to form a washing water flow, a first body forming a washing water flow path so that the washing water flows is introduced thereinto, a second body in which the first body is accommodated and which is coupled to an inner wall of the spin basket, a filter disposed in the washing water flow path, and a first cover covering the first body to protect the first body, a second cover covering the second body at an upper portion and a lower portion of the first cover to protect the second body, a first sealing member disposed between the first body and the first cover to seal a space between the first body and the first cover, and a second sealing member disposed between the second body and the second cover to seal a space between the second body and the second cover.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
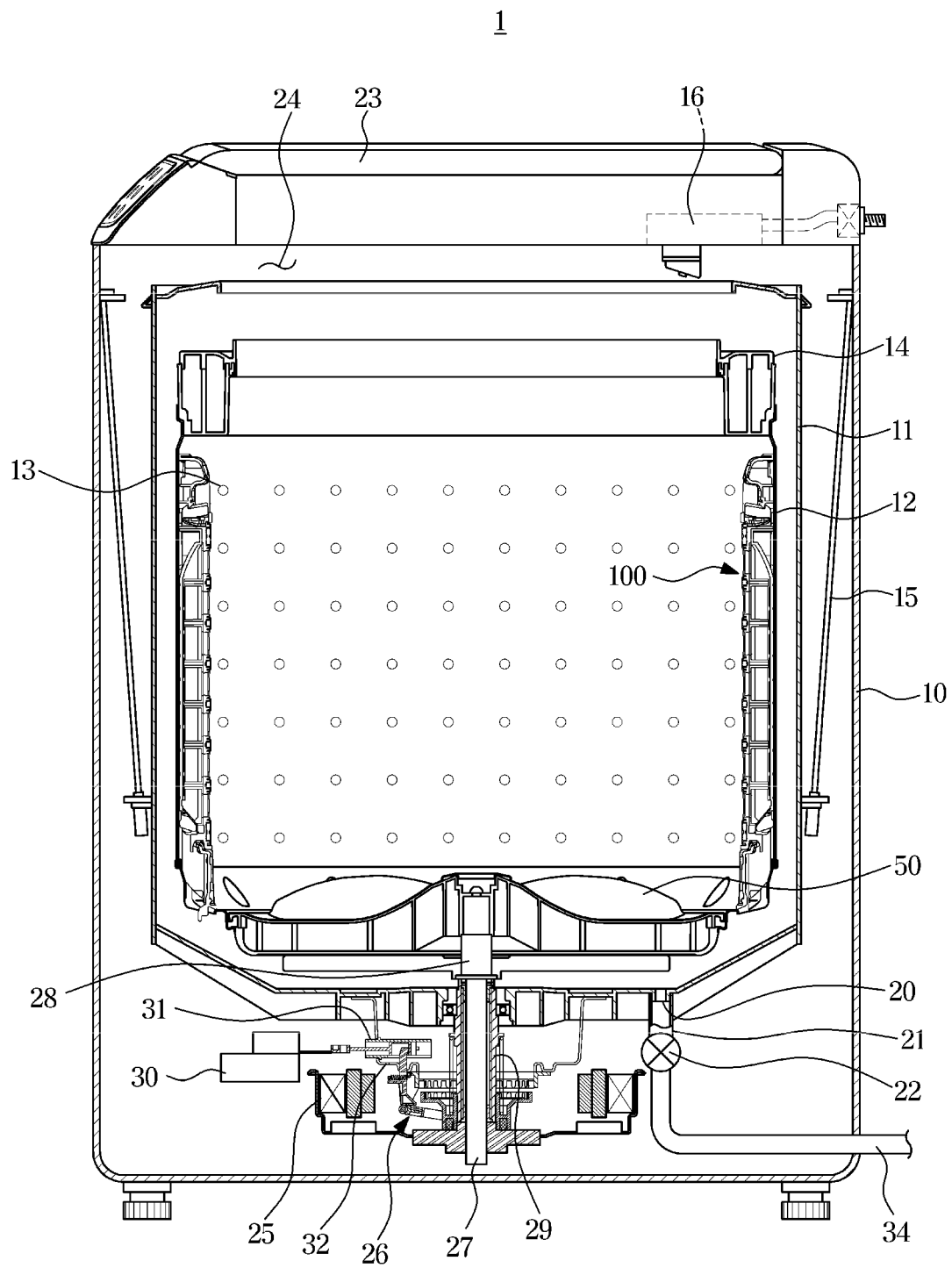
FIG. 1 is a cross-sectional view of a washing machine according to one embodiment of the present disclosure.

Embodiments disclosed in the present specification and the components shown in the drawings are merely exemplary embodiments of the disclosed disclosure and various modifications capable of replacing the embodiments and drawings of the present specification may be made at the time of filing the present application.

Further, the same reference numerals or symbols given in each drawing of the present specification indicate parts or components performing substantially the same function.

Further, terms used herein are used to illustrate the embodiments and are not intended to limit and/or restrict the disclosed disclosure. As used herein, singular forms are intended to include plural forms as well, unless the context clearly indicates otherwise. Terms "comprise," "have," and the like are used herein to specify the presence of stated features, numerals, steps, operations, components, parts or combinations thereof but do not preclude the presence or addition of one or more other features, numerals, steps, operations, components, parts, or combinations thereof.

Further, terms including ordinal numbers such as "first," "second," and the like used herein may be used to describe various components, but the components are not limited by these terms. The terms are used merely for the purpose of distinguishing one component from another. For example, without departing from the scope of the present disclosure, a first component may be referred to as a second component, and similarly, a second component may be referred to as a first component. The term "and/or" includes any one or a combination of a plurality of associated listed items.

Meanwhile, terms such as "front side," "rear side," "left side," and "right side" used in the following descriptions are defined on the basis of drawings, and the shape and position of each component should not be limited by these terms.

Hereinafter, embodiments of the present disclosure will be described in detail with reference to the accompanying drawings.

FIG. 1 is a cross-sectional view of a washing machine according to one embodiment of the present disclosure.

Referring to FIG. 1, a washing machine 1 includes a cabinet 10 that forms an exterior, a tub 11 disposed inside the cabinet 10 to contain washing water, a spin basket 12 rotatably disposed inside the tub 11, and a pulsator 50 disposed inside the spin basket 12 and configured to generate a water flow.

An input opening 24 is formed at an upper portion of the cabinet 10 to allow laundry to be put into the spin basket 12. The input opening 24 may be opened and closed by a door 23 installed at the upper portion of the cabinet 10. The tub 11 may be supported by a suspension device 15 within the cabinet 10.

A water supply pipe 17 for supplying washing water into the tub 11 is installed at an upper portion of the tub 11. One side of the water supply pipe 17 is connected to an external water source, and the other side of the water supply pipe 17 is connected to a detergent supply device 16. Water supplied through the water supply pipe 17 is supplied into the tub 11 together with detergent via the detergent supply device 16. A water supply valve 18 is installed in the water supply pipe 17 to control the supply of the water.

The spin basket 12 is provided in a cylindrical shape having an open upper portion, and a plurality of drainage holes 13 are formed in a side surface of the spin basket 12. A balancer 14 may be mounted on the upper portion of the spin basket 12 so that the spin basket 12 can stably rotate during high-speed rotation.

A motor 25 configured to generate a driving force for rotating the spin basket 12 and the pulsator 50, and a power switching device 26 configured to simultaneously or selectively transmit the driving force generated from the motor 25 to the spin basket 12 and the pulsator 50 are installed at an outer lower side of the tub 11.

A hollow type spin-drying shaft 29 may be coupled to the spin basket 12, and a washing shaft 27 installed in a hollow part of the spin-drying shaft 29 may be coupled to the pulsator 50 through a washing shaft coupling part 28. The motor 25 may simultaneously or selectively transmit the driving force to the spin basket 12 and the pulsator 50 according to a vertical movement of the power switching device 26.

The power switching device 26 may include an actuator 30 that generates a driving force for power switching, a rod part 31 that rectilinearly moves according to the movement of the actuator 30, and a clutch part 32 connected to the rod part 31 to rotate according to the movement of the rod part 31.

A drain port 20 is formed at a bottom of the tub 11 to discharge washing water stored in the tub 11, and a first drain pipe 21 is connected to the drain port 20. A drain valve 22 configured to control draining may be installed at the first drain pipe 21. An outlet of the drain valve 22 may be connected to a second drain pipe 34 for discharging washing water to the outside.

Figure 2:
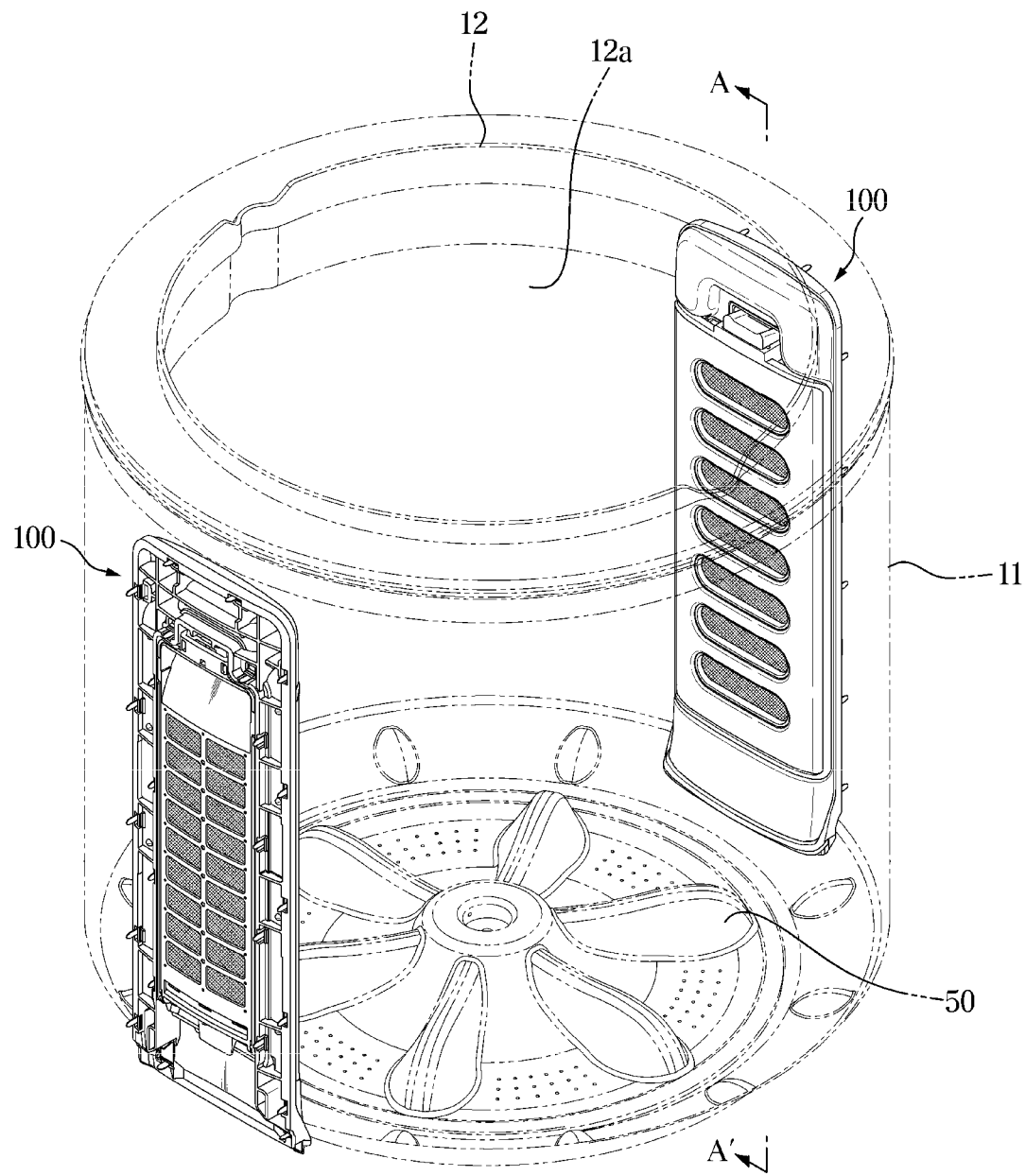
FIG. 2 is a view illustrating an internal structure of the washing machine shown in FIG. 1.
Figure 3:
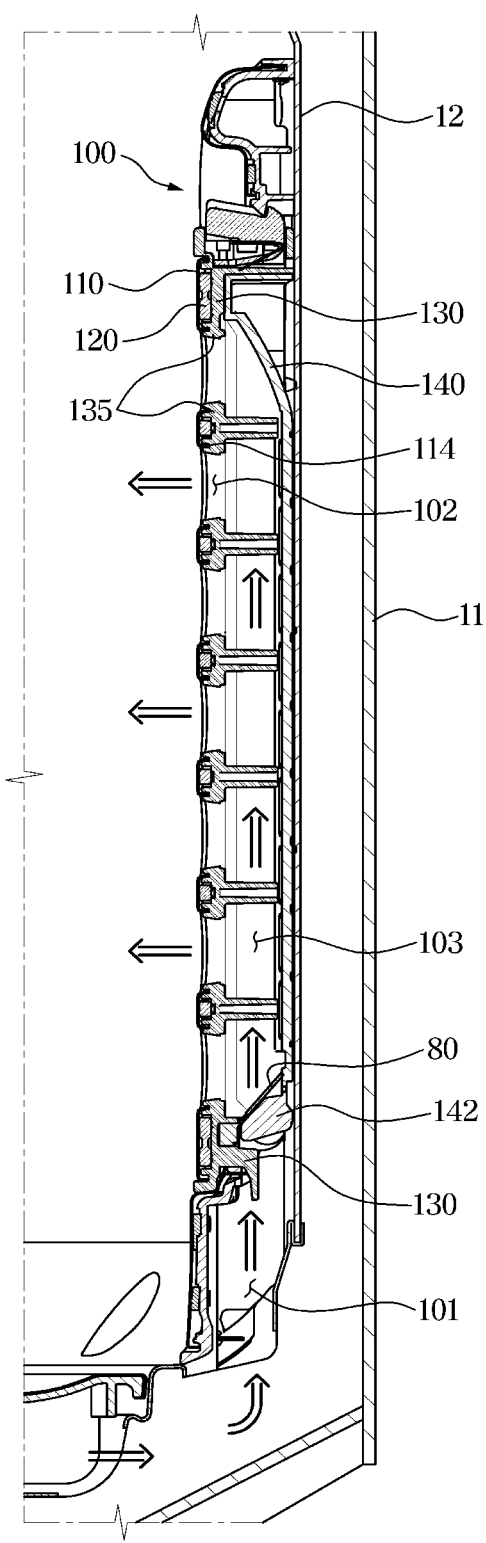
FIG. 3 is a cross-sectional view taken along line A-A' of a filter device shown in FIG. 2.

FIG. 2 is a view illustrating an internal structure of the washing machine shown in FIG. 1. FIG. 3 is a cross-sectional view taken along line A-A' of a filter device shown in FIG. 2.

Referring to FIGS. 2 and 3, the washing machine may include a filter device 100 for filtering foreign substances in washing water. The filter device 100 may filter washing water inside the spin basket 12 by circulating the washing water.

The filter device 100 is attached to an inner wall 12*a* of the spin basket 12 to guide the washing water flow generated from the pulsator 50 to the upper portion of the spin basket 12. The number of filter devices 100 illustrated in the drawing is a pair of filter devices 100 facing each other, but the present disclosure is not limited thereto.

The filter device 100 may include an inlet 101, an outlet 102, and a washing water flow path 103. The washing water flow path 103 may be provided inside the filter device 100 so that the washing water circulates therethrough. The inlet 101 and the outlet 102 may be provided so that the filter device 100 communicates with the inside of the spin basket 12.

The filter device 100 may be fixed to the inner wall 12*a* of the spin basket 12. The filter device 100 may be fixed to the inner wall 12*a* of the spin basket by a fastening protrusion 154, which will be described below. That is, the fastening protrusion 154 is disposed at one side of the filter device 100 so that the filter device 100 may be fixed to the inner wall 12*a* of the spin basket 12.

Figure 4:
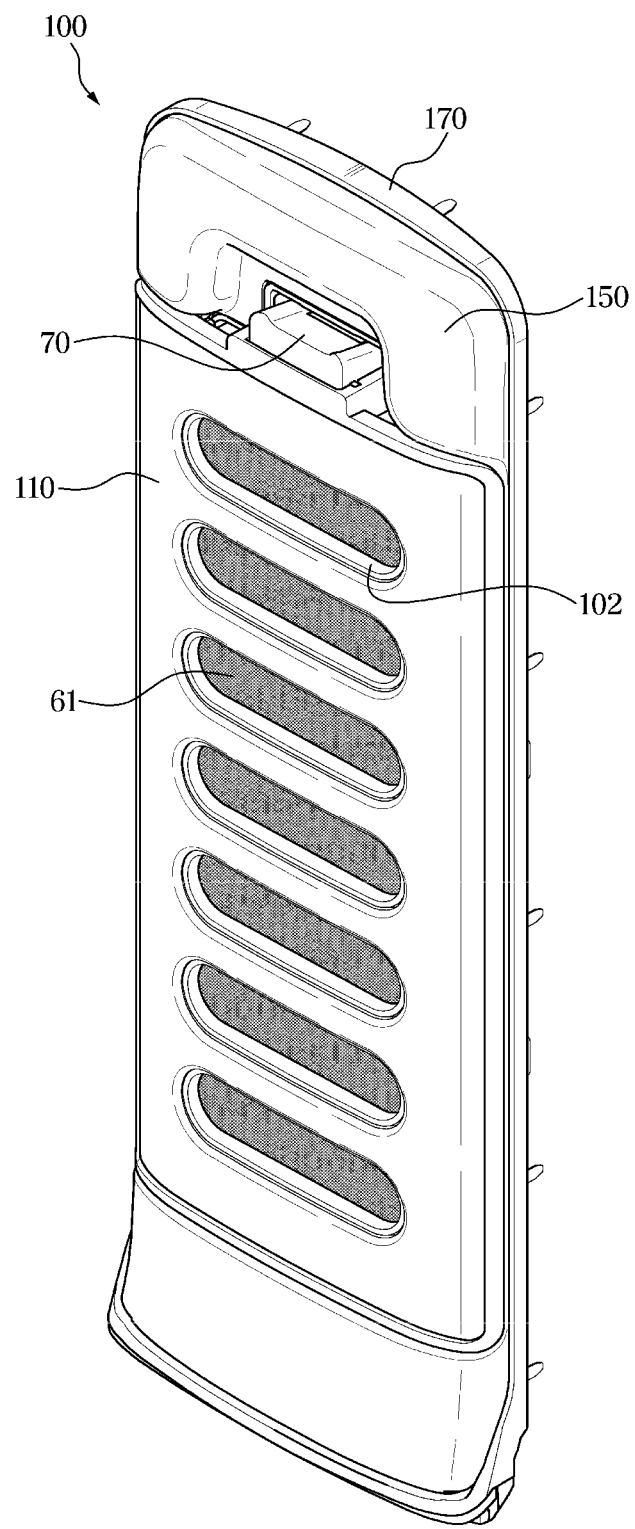
FIG. 4 is a perspective view illustrating the filter device in the washing machine shown in FIG. 1.
Figure 5:
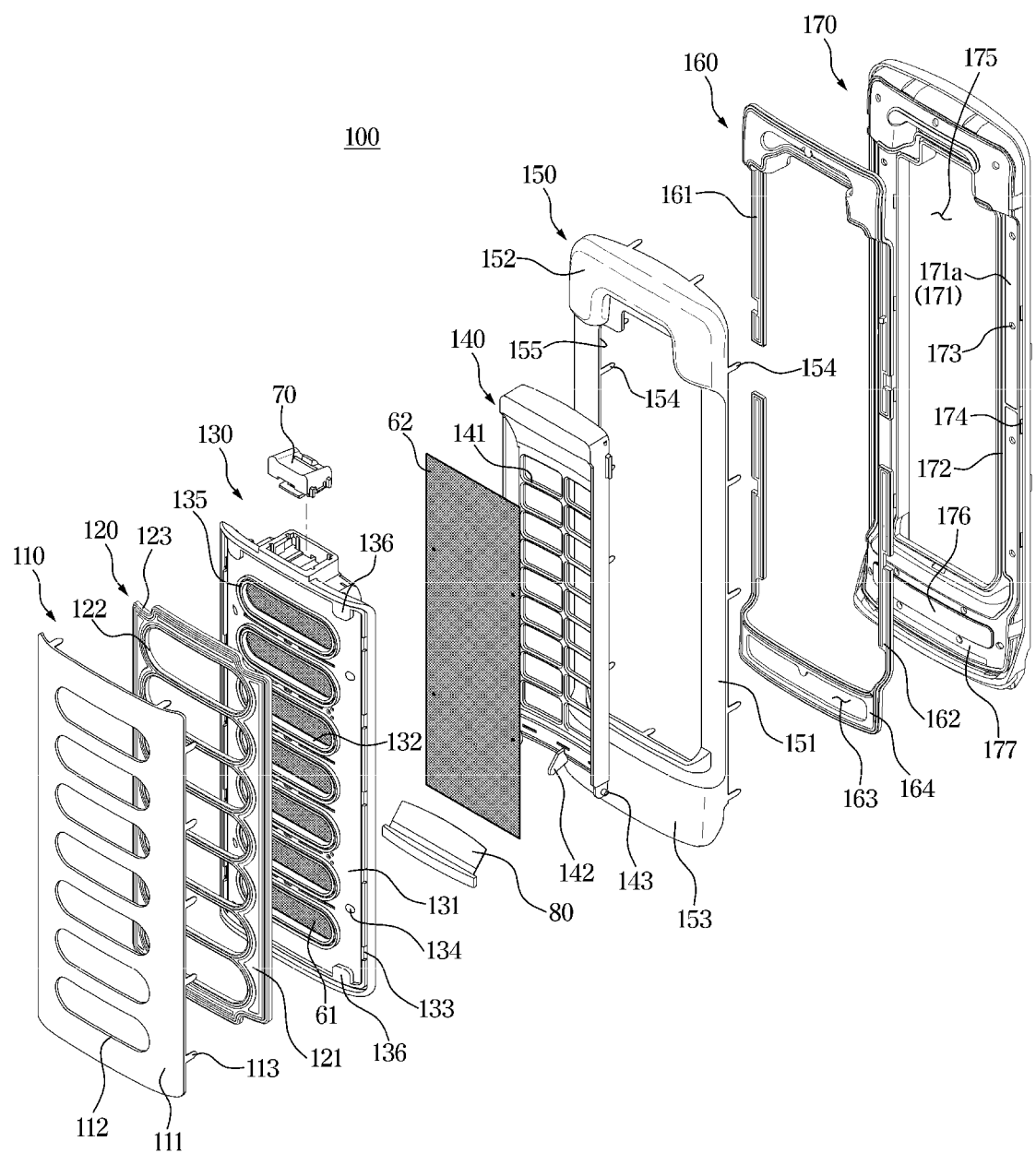
FIG. 5 is an exploded perspective view of the filter device shown in FIG. 4.

FIG. 4 is a perspective view illustrating the filter device in the washing machine shown in FIG. 1. FIG. 5 is an exploded perspective view of the filter device shown in FIG. 4.

Referring to FIGS. 4 and 5, the filter device 100 may include a body 130, a filter 60, a cover 110, and a sealing member 120.

The body may be a first body 130. The first body 130 may form the washing water flow path 103. The filter 60 is disposed in the washing water flow path 103 to filter foreign substances contained in washing water. The filter 60 may be accommodated in the first body 130.

The first body 130 may include a base 131, a body discharge hole 132, a cover mounting hole 133, a coupling hole 134, a protective protrusion 135, and an edge protrusion 136. The base 131 may form a body of the first body 130.

The body discharge hole 132 may be configured so that washing water is discharged from the base 131. The body discharge hole 132 may be formed so that the washing water is discharged through the washing water flow path 103 and the filter. That is, the body discharge hole 132 may allow the filtered washing water to flow into an inside of a washing basket 12 again through the outlet 102. A plurality of body discharge holes 132 may be provided along a vertical direction. However, the shape of the body discharge hole 132 is not limited to the example illustrated in the drawing, and the body discharge hole 132 may have various shapes. The body discharge hole 132 may be formed to be smaller than a cover discharge hole 112 and a hole 122 of the sealing member, which will be described below. Through this, it is possible to prevent an empty space from being formed in a region in which a hole is formed when the first body 130, a first cover 110, and a first sealing member 120 are coupled. That is, the first body 130, the first cover 110, and the first sealing member 120 may be suitably coupled to each other without a gap.

The cover mounting hole 133 may be provided so that the first cover 110 and the first body 130 are coupled to each other. The cover mounting hole 133 may be coupled to a cover protrusion 113 provided on the first cover 110. The cover mounting hole 133 may be provided to correspond to the cover protrusion 113. Although not shown in the drawing, the cover protrusion 113 may be coupled through the cover mounting hole 133. The cover protrusion 113 may pass through the cover mounting hole 133, and then the cover protrusion 113 may be bent to allow the first cover 110, the first sealing member 120, and the first body 130 to be coupled. The cover mounting hole 133 may be provided along an outer line of the first body 130. A plurality of cover mounting holes 133 may be provided.

The coupling hole 134 allows the first sealing member 120 and the first body 130 to be stably coupled to each other. The coupling hole 134 may be coupled to a coupling protrusion 124 provided on the first sealing member 120. The coupling hole 134 may have a shape corresponding to the coupling protrusion 124. The coupling hole 134 may be provided at an outer periphery portion of the first body 130. That is, the coupling hole 134 may be provided at an outer periphery portion of the base 131. The coupling hole 134 may be provided in a number corresponding to the number of the coupling protrusions 124. That is, a plurality of coupling holes 134 may be provided. However, the number of the coupling holes 134 is not limited as long as the first sealing member 120 and the first body 130 are stably coupled to each other.

The protective protrusion 135 may form the body discharge hole 132. The protective protrusion 135 may protrude in a direction toward the first cover 110 to form the body discharge hole 132. Although not shown in the drawings, when the first cover 110 and the first body 130 are coupled to each other, the protective protrusion 135 may protrude further toward the inside of the spin basket 12 than the first cover 110. Accordingly, the first cover 110 may not be damaged due to clothes during a washing operation, and the protective protrusion 135 may be damaged instead of the first cover 110. Accordingly, it is possible to prevent the first cover 110 from being damaged due to clothes and to maintain the aesthetics of an exterior of the first cover 110 formed of a stainless material.

The edge protrusion 136 may be provided so that the first sealing member 120 is coupled to the first body 130. The edge protrusion 136 may be formed to correspond to a recessed part 123 provided in the sealing member 120. The edge protrusion 136 may protrude from an edge portion of the first body 130. The edge protrusion 136 may protrude at least either upward or downward from the edge portion of the base 131. Specifically, the edge protrusion 136 may include a first edge protrusion 136 and a second edge protrusion 136. The first edge protrusion 136 may be provided to protrude upward from a lower end portion of the base 131. The first edge protrusion 136 may protrude from a lower edge portion of the base 131. The second edge protrusion 136 may protrude downward from an upper end portion of the base 131. The second edge protrusion 136 may protrude from an upper edge portion of the base 131.

The filter device 100 may include a handle 70. The handle 70 may be provided on an upper portion of the first body 130. The first body 130 may be coupled to a case 140. The handle 70 may allow the coupled first body 130 and case 140 to be rotatably coupled to a second body 170. The handle 70 may allow the first body 130 and the case 140 to be detachably coupled to the second body 170.

The filter device 100 may include the filter 60.

The filter 60 is disposed in the filter device 100 to filter out foreign substances contained in washing water flowing through the filter device 100. That is, the filter 60 may be disposed in the washing water flow path 103. The filter 60 may include a first filter 61 and a second filter 62. The first filter 61 may be accommodated in the first body 130 to filter the foreign substances of the washing water. The second filter 62 may be coupled to the case 140 to filter the foreign substances of the washing water flowing through the washing water flow path 103. That is, in the embodiment of the present disclosure, the filter 60 may be provided to filter out the foreign substances contained in the washing water when the washing water, which is introduced through the inlet 101, passes through the washing water flow path 103 and is discharged to the spin basket 12 through the outlet 102.

The cover 110 may be coupled to the first body 130 to form a portion of an inner circumferential surface of the spin basket 12. The cover may include a stainless material. That is, the cover may be formed of a stainless material. Accordingly, the aesthetics of an exterior of the filter device 100 on the inner circumferential surface of the spin basket 12 may be improved, and the corrosion resistance of the filter device 100 may be increased by covering the configuration of the first body 130 and the like. The cover 110 may be the first cover 110.

The first cover 110 may include a cover part 111, the cover discharge hole 112, and the cover protrusion 113. The cover part 111 may form a portion of the inner circumferential surface of the spin basket 12. That is, the cover part 111 may be provided to cover the first body 130. The cover part 111 may be provided to correspond to the base 131 of the first body 130. However, the shape of the cover part 111 is not limited to the above-described example, and the cover part 111 may have various shapes as long as the corrosion resistance of the first body 130 may be increased by covering the first body 130.

The cover discharge hole 112 may allow washing water to be discharged through the cover. That is, the washing water passing through the washing water flow path 103 and the body discharge hole 132 may be introduced into the spin basket 12 through the cover discharge hole 112. That is, the cover discharge hole 112 may allow the filtered washing water to flow into the inside of the washing basket 12 again through the outlet 102. A plurality of cover discharge holes 112 may be provided along the vertical direction. The cover discharge hole 112 may be provided to correspond to the body discharge hole 132 and the hole 122 of the sealing member. Specifically, the cover discharge hole 112 may be formed to be smaller than the hole 122 of the sealing member. Through this, it is possible to prevent an empty space from being formed in a region in which a hole is formed when the first cover 110 is coupled to the first sealing member 120. That is, the first cover 110 and the first sealing member 120 may be suitably coupled to each other without a gap. However, the shape of the cover discharge hole 112 is not limited to the example illustrated in the drawing, and the cover discharge hole 112 may have various shapes.

The cover protrusion 113 may be provided so that the first cover 110 and the first body 130 are coupled to each other. The cover protrusion 113 may be coupled to the cover mounting hole 133 provided in the first body 130. The cover protrusion 113 may be provided in a position and shape corresponding to the cover mounting hole 133. However, the shape of the cover protrusion 113 is not limited thereto, and the cover protrusion 113 may have various shapes as long as the first cover 110 may be stably coupled to the first body 130. Although not shown in the drawing, the cover protrusion 113 may be coupled through the cover mounting hole 133. The cover protrusion 113 may pass through the cover mounting hole 133, and then the cover protrusion 113 may be bent to allow the first cover 110, the first sealing member 120, and the first body 130 to be coupled. The cover protrusion 113 may be provided along an outer periphery of the first cover 110. A plurality of cover protrusions 113 may be provided.

The sealing member 120 may be the first sealing member 120. The first sealing member 120 may be disposed between the first body 130 and the first cover 110. The first sealing member 120 may seal a space provided between the first body 130 and the first cover 110. Accordingly, since there is no space between the first body 130 and the first cover 110, washing water, foreign substances, and the like may not be introduced. Since the washing water or foreign substances are not introduced, mold or odors may not be generated.

Accordingly, a dust collecting device of the washing machine may be maintained more cleanly, durability may be improved, and a use period may be extended.

The first sealing member 120 may include a sealing part 121, the hole 122, and the recessed part 123. The sealing part 121 may be disposed between the base 131 of the first body 130 and the cover part 111 of the first cover 110. That is, the sealing part 121 may be provided in a shape corresponding to the base 131 of the first body 130 or the cover part 111 of the first cover 110.

The hole 122 may allow washing water to be discharged into the spin basket 12 through the sealing member 120. That is, the washing water passing through the washing water flow path 103 and the body discharge hole 132 may be introduced into the spin basket 12 through the hole 122. The hole 122 may allow the filtered washing water to flow into the inside of the washing basket 12 again through the outlet 102. The hole 122 may be provided to correspond to at least one of the cover discharge hole 112 and the body discharge hole 132. A plurality of holes 122 may be provided along the vertical direction. However, the shape of the hole 122 is not limited to the example illustrated in the drawing, and the hole 122 may have various shapes. The hole 122 may be formed to be greater than the cover discharge hole 112 and the body discharge hole 132. Through this, it is possible to prevent an empty space from being formed in a region in which a hole is formed when the first sealing member 120 is coupled to the first cover 110 and the first body 130. That is, the first sealing member 120 may be suitably coupled to the first cover 110 and the first body 130 without a gap.

The filter device 100 may further include a valve 80. The valve 80 may be coupled to a lower portion of the first body 130. The valve 80 may open and close the inlet 101. The valve 80 may be prevented from being rotated to the outside of the first body 130 due to a stopper 142 provided in the case 140. The valve 80 may prevent the washing water from flowing back into the washing water flow path 103. That is, the washing water may be discharged only to the body discharge hole 132 and a mesh part 141.

The filter device 100 may further include the case 140. The case 140 may be coupled to the first body 130. In addition, the case 140 may be rotatably coupled to the second body 170 to be described later through hinges 143. The case 140 may be accommodated in the second body 170. That is, the case 140 may be accommodated in an opening 172 of the second body 170.

The case 140 may include the mesh part 141, the stopper 142, and the hinges 143. The washing water that is not discharged through the body discharge hole 132 may flow through the mesh part 141. The second filter 62 may be coupled to the mesh part 141 to filter foreign substances contained in the washing water. The stopper 142 may be provided at a lower portion of the case 140. The stopper 142 may prevent the valve 80 mounted on the first body 130 from being rotated to the outside of the first body 130. The hinges 143 may be provided at both sides of the lower portion of the case 140. The hinges 143 may allow the case 140 to be rotatably coupled to the second body 170.

The filter device 100 may include the second body 170, a second cover 150, and a second sealing member 160.

The first body 130 may be accommodated in the second body 170. That is, the second body 170 may be formed outside the first body 130. The second body 170 may have a substantially right hexagonal shape. The second body 170 may include a base 171, the opening 172, a communication hole 173, a through hole 174, an accommodation space 175, a protruding surface 176, and a recessed surface 177.

The base 171 may form a body of the second body 170. The second body 170 may include the opening 172 so that the first body 130 and the case 140 are accommodated therein. The opening 172 may form the accommodation space 175. The base 171 may include a first side 171*a* facing the second sealing member 160 and a second side 171*b* facing a direction opposite to the first side 171*a*.

The communication hole 173 may be formed at an outer periphery portion of the second body 170. That is, referring to FIG. 7 together, the communication hole 173 configured to allow the first side 171*a* and the second side 171*b* to communicate may be formed at an outer periphery portion of the base 171. The communication hole 173 may allow an injection-molding material forming the second sealing member 160 to flow from the first side 171*a* to the second side 171*b* when the second sealing member 160 is injection-molded. As the injection-molding material flows from the first side 171*a* to the second side 171*b*, the second sealing member 160 and the second body 170 may be coupled to each other. That is, the injection-molding material flows into the second side 171*b* to form a coupling part 165. When the second sealing member 160 is coupled to the second body 170, the coupling part 165 may block the communication hole 173.

The through hole 174 may be provided so that the second cover 150 and the second body 170 are coupled to each other. The through hole 174 may be coupled to the fastening protrusion 154 provided on the second cover 150. The through hole 174 may be provided to correspond to the fastening protrusion 154. The fastening protrusion 154 may be coupled to the second body 170 through the through hole 174. The fastening protrusion 154 may pass through the through hole 174, and then may be coupled to the spin basket 12. The through hole 174 may be provided along an outer periphery of the second body 170. A plurality of through holes 174 may be provided.

The protruding surface 176 and the recessed surface 177 may be provided on a lower portion of the second body 170. The protruding surface 176 may protrude from the lower portion of the second body 170 toward the second sealing member 160. The protruding surface 176 may be inserted into a lower hole 163. Since the protruding surface 176 is inserted into the lower hole 163, the second sealing member 160 may be stably coupled to the second body 170 without being separated from the second body 170. The protruding surface 176 may be formed to correspond to the lower hole 163 provided in the second sealing member 160. The recessed surface 177 may be formed to be recessed from the protruding surface 176. An adhesive surface 164 of the second sealing member 160 may be in contact with the recessed surface 177. An adhesive may be applied to the recessed surface 177, and thus the second sealing member 160 may not be peeled off from the second body 170.

The second cover 150 may be coupled to the second body 170 to form a portion of the inner circumferential surface of the spin basket 12. The second cover 150 may include a stainless material. That is, the second cover 150 may be formed of a stainless material. Accordingly, the aesthetics of the exterior of the filter device 100 on the inner circumferential surface of the spin basket 12 may be improved, and the corrosion resistance of the filter device 100 may be increased by covering the second body 170.

The second cover 150 may include a cover part 151, the fastening protrusion 154, and an opening 155. The cover part 151 may form a portion of the inner circumferential surface of the spin basket 12. That is, the cover part 151 may be provided to cover the second body 170 and the second sealing member 160. The cover part 151 may be provided to correspond to the base 171 of the second body 170. However, the shape of the cover part 151 is not limited to the above-described example, and the cover part 151 may have various shapes as long as the corrosion resistance of the second body 170 may be increased by covering the second body 170.

The cover part 151 may include an upper portion 152 and a lower portion 153. The upper portion 152 and the lower portion 153 of the second cover 150 may be disposed above and below the first cover 110. Accordingly, the upper portion 152 and the lower portion 153 of the second cover 150 may form the inner circumferential surface of the spin basket 12.

The fastening protrusion 154 may be provided so that the second cover 150 and the second body 170 are coupled to each other. The fastening protrusion 154 may be coupled to the through hole 174 provided in the second body 170. The fastening protrusion 154 may be coupled through the through hole 174. The fastening protrusion 154 may be provided in a position and shape corresponding to the through hole 174. The shape of the fastening protrusion 154 is not limited thereto, and the fastening protrusion 154 may have various shapes as long as the second cover 150, the second sealing member 160, and the second body 170 may be stably coupled. The fastening protrusion 154 may pass through the through hole 174, and then may be coupled to the spin basket 12. Accordingly, the second cover 150, the second sealing member 160, and the second body 170 may be coupled to each other. The fastening protrusion 154 may be provided along an outer periphery of the cover part 151 and an outer periphery of the opening 155. A plurality of fastening protrusions 154 may be provided.

The opening 155 of the second cover 150 may be provided so that the first body 130 and the case 140 are accommodated therein. The opening 155 of the second cover 150 may be formed to correspond to the opening 172 of the second body 170.

The second sealing member 160 may be disposed between the second body 170 and the second cover 150. The second sealing member 160 may seal a space provided between the second body 170 and the second cover 150. Accordingly, since there is no space between the second body 170 and the second cover 150, washing water, foreign substances, and the like may not be introduced. Since the washing water or foreign substances are not introduced, mold or odors may not be generated. Accordingly, the dust collecting device of the washing machine may be maintained more cleanly, durability may be improved, and a use period may be extended.

The second sealing member 160 may include sealing parts 161 and 162, the lower hole 163, and the adhesive surface 164. The sealing parts 161 and 162 may be disposed between the base 171 of the second body 170 and the cover part 151 of the second cover 150. That is, the sealing parts 161 and 162 may be provided in a shape corresponding to the base 171 of the second body 170 or the cover part 151 of the second cover 150. The sealing parts 161 and 162 may include a first sealing part 161 and a second sealing part 162. The first sealing part 161 may be provided on an upper side, and the second sealing part 162 may be provided on a lower side.

The lower hole 163 may be provided so that the protruding surface 176 provided in the second body 170 is accommodated therein. The protruding surface 176 may be inserted into the lower hole 163. Since the protruding surface 176 is inserted into the lower hole 163, the second sealing member 160 may be stably coupled to the second body 170 without being separated from the second body 170. The lower hole 163 may be formed to correspond to the protruding surface 176 formed in the second body 170. The adhesive surface 164 may form the lower hole 163 from an outer side of the lower hole 163. The adhesive surface 164 may be in contact with the recessed surface 177 provided in the second body 170.

The second sealing member 160 may be formed by insert injection-molding or double injection-molding. Specifically, after the second body 170 is insert-molded, the second sealing member 160 may be formed by being injection-molded. Thereafter, the second cover 150 may be coupled to the second body 170 and the second sealing member 160. Alternatively, the second body 170 may be injection-molded first and then the second sealing member 160 may be double-injection molded. After the second sealing member 160 is double-injection molded, the second cover 150 may be coupled to the second body 170 and the second sealing member 160. Accordingly, the second sealing member 160 may be coupled to the second body 170 without an additional process, and productivity may be increased.

Figure 6:
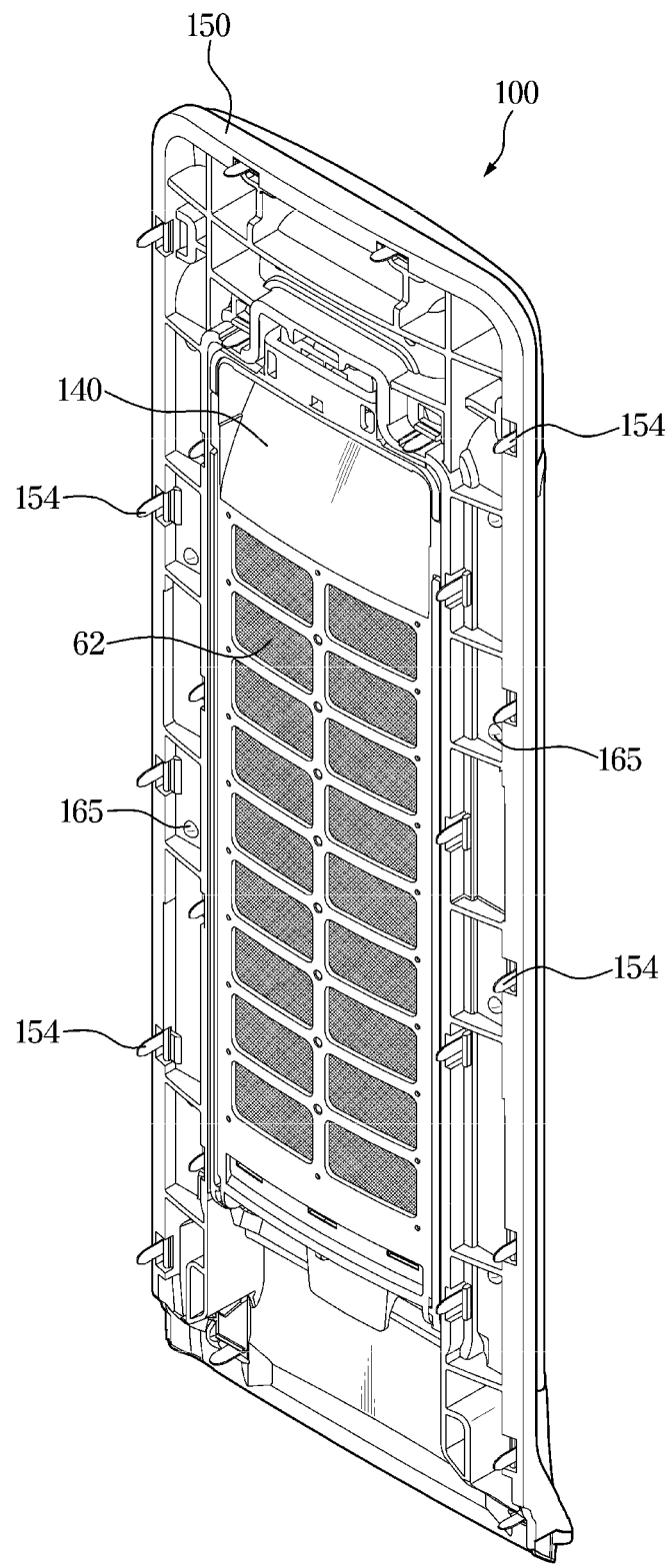
FIG. 6 is a perspective view illustrating the filter device shown in FIG. 4 at another angle.
Figure 7:
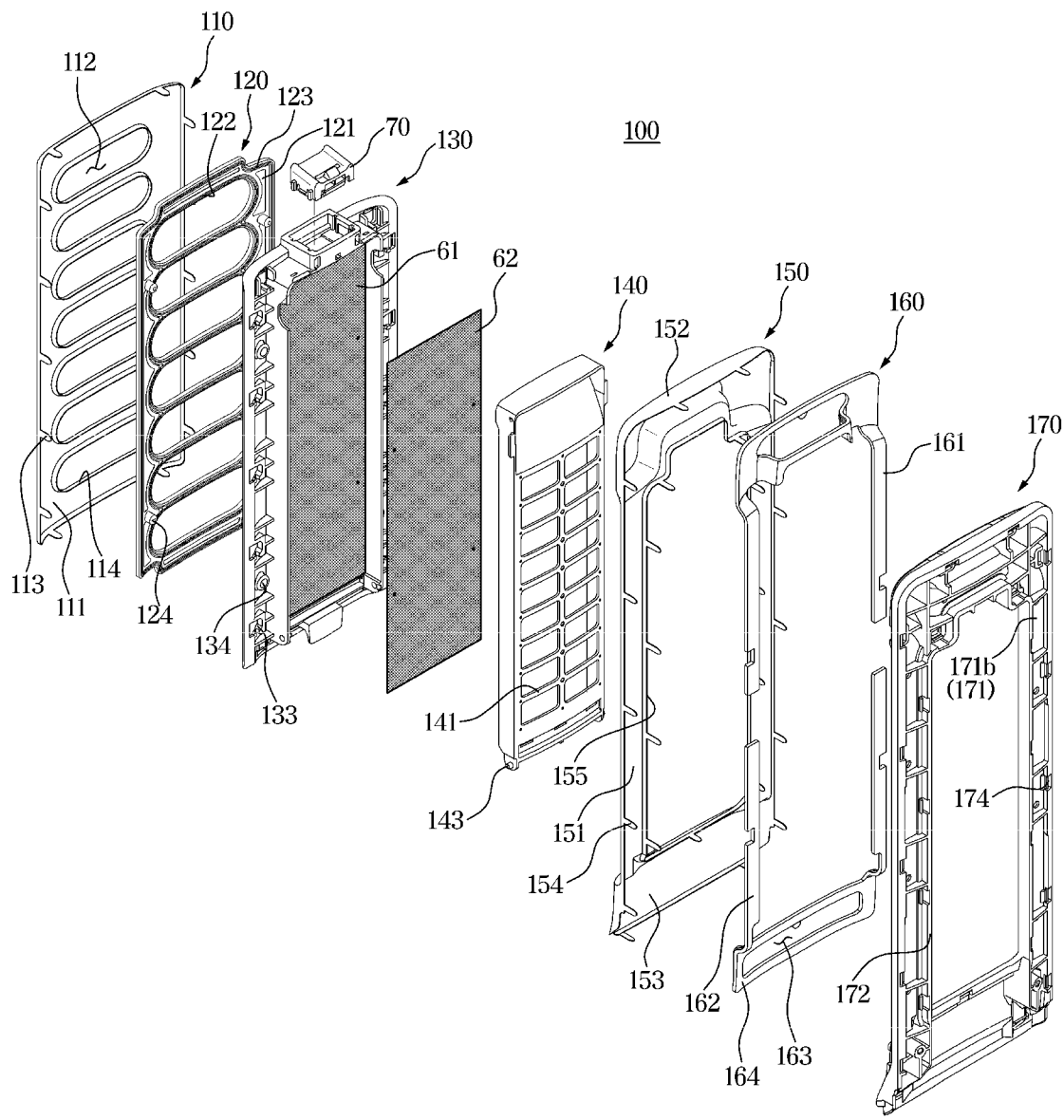
FIG. 7 is an exploded perspective view of the filter device shown in FIG. 6.

FIG. 6 is a perspective view illustrating the filter device shown in FIG. 4 at another angle. FIG. 7 is an exploded perspective view of the filter device shown in FIG. 6.

Referring to FIGS. 6 and 7, the fastening protrusion 154 of the second cover 150 may pass through the second body 170. Accordingly, the second cover 150, the second sealing member 160, and the second body 170 may be coupled into one. In addition, the injection-molding material forming the second sealing member 160 may flow from the first side 171a to the second side 171b to form the coupling part 165. The coupling part 165 may have a larger area than the communication hole 173. Accordingly, the second sealing member 160 and the second body 170 may be coupled to each other without separated.

The first cover 110 may include a forming rib 114 that forms the cover discharge hole 112. The forming rib 114 may extend in a direction toward the first sealing member 120. The forming rib 114 may be disposed inside the hole of the first sealing member 120. Specifically, referring to FIG. 3, the forming rib 114 may be disposed between the first sealing member 120 and the protective protrusion 135. Accordingly, a space may not be generated between the first sealing member 120 and the protective protrusion 135, and foreign substances or mold may not be generated between the first sealing member 120 and the protective protrusion 135. In addition, the first sealing member 120 may seal a space provided between the forming rib 114 and the protective protrusion 135.

The first sealing member 120 may include the coupling protrusion 124. The coupling protrusion 124 allows the first sealing member 120 to be coupled to the first body 130. The coupling protrusion 124 may be coupled to the coupling hole 134 provided in the first body 130. The coupling hole 134 may have a shape corresponding to the coupling protrusion 124.

The components of the filter device 100 according to one embodiment of the present disclosure have been described above. However, it will be appreciated that the above-described components are not essential to configure the filter device 100, and even when some components are omitted, the effects of the disclosure may be achieved.

Figure 8:
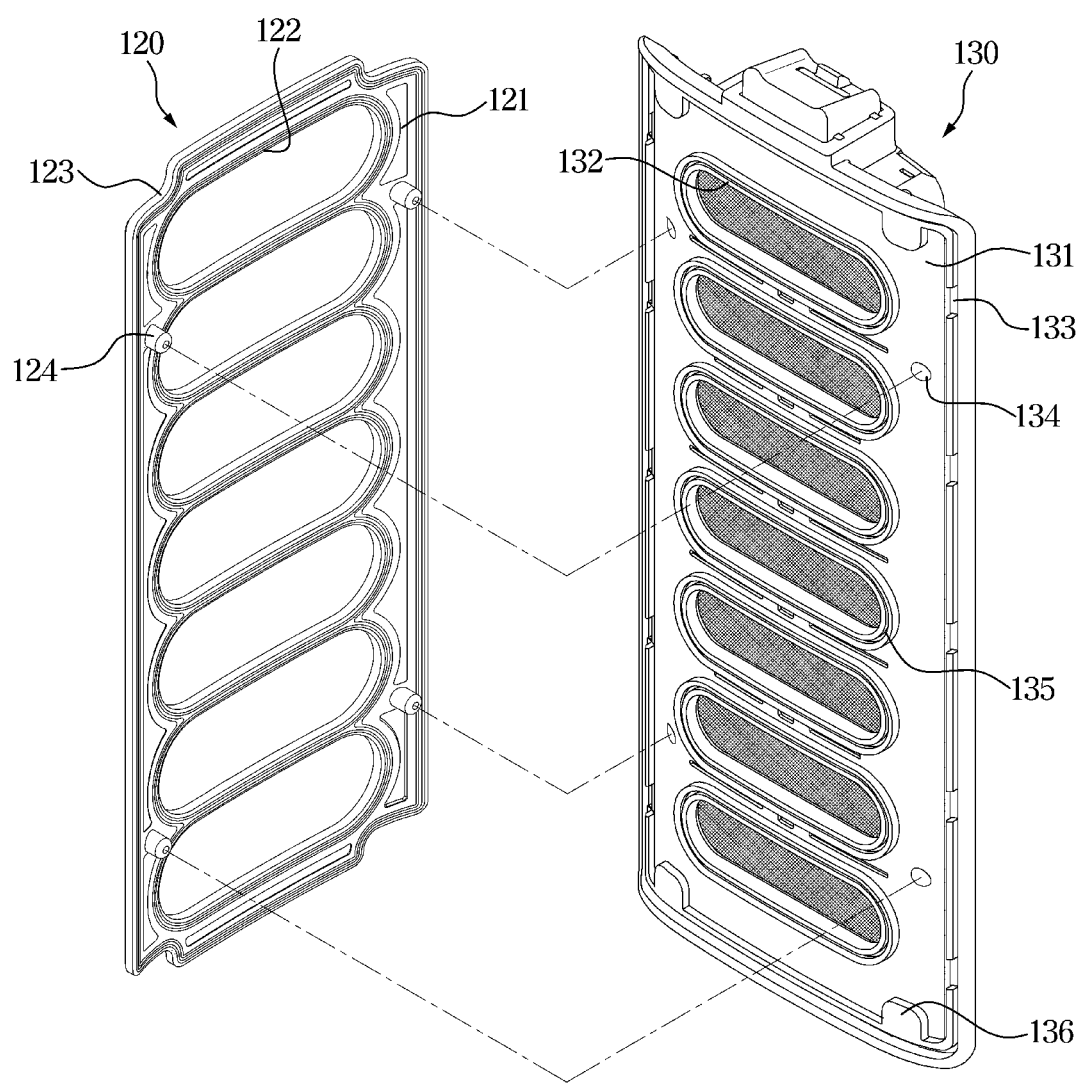
FIG. 8 is a view illustrating a coupling relationship of a first sealing member and a first body in the filter device illustrated in FIG. 4.

FIG. 8 is a view illustrating a coupling relationship of the first sealing member 120 and the first body 130 in the filter device illustrated in FIG. 4.

Referring to FIG. 8, the coupling protrusion 124 may be provided at an outer periphery portion of the first sealing member 120. That is, the coupling protrusion 124 may be provided at an outer periphery portion of the sealing part. The coupling hole 134 may be provided at the outer periphery portion of the first body 130. That is, the coupling hole 134 may be provided at the outer periphery portion of the base 131. The coupling hole 134 may be provided in a number corresponding to the number of the coupling protrusions 124. The coupling protrusion 124 and the coupling hole 134 may each be provided in plural numbers. However, the numbers of coupling holes 134 and coupling protrusions 124 are not limited as long as the first sealing member 120 and the first body 130 are stably coupled to each other.

Figure 9:
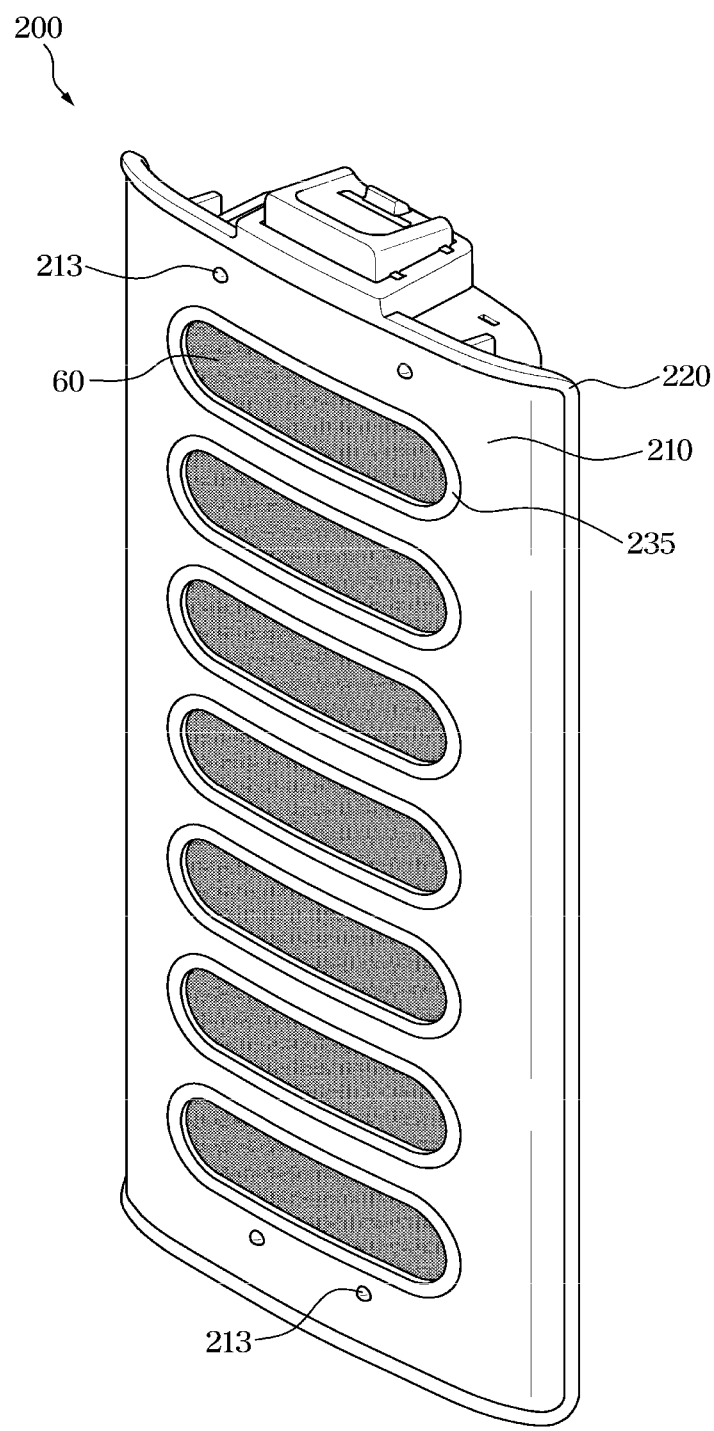
FIG. 9 is a perspective view illustrating a filter device in a washing machine, according to another embodiment of the present disclosure.
Figure 10:
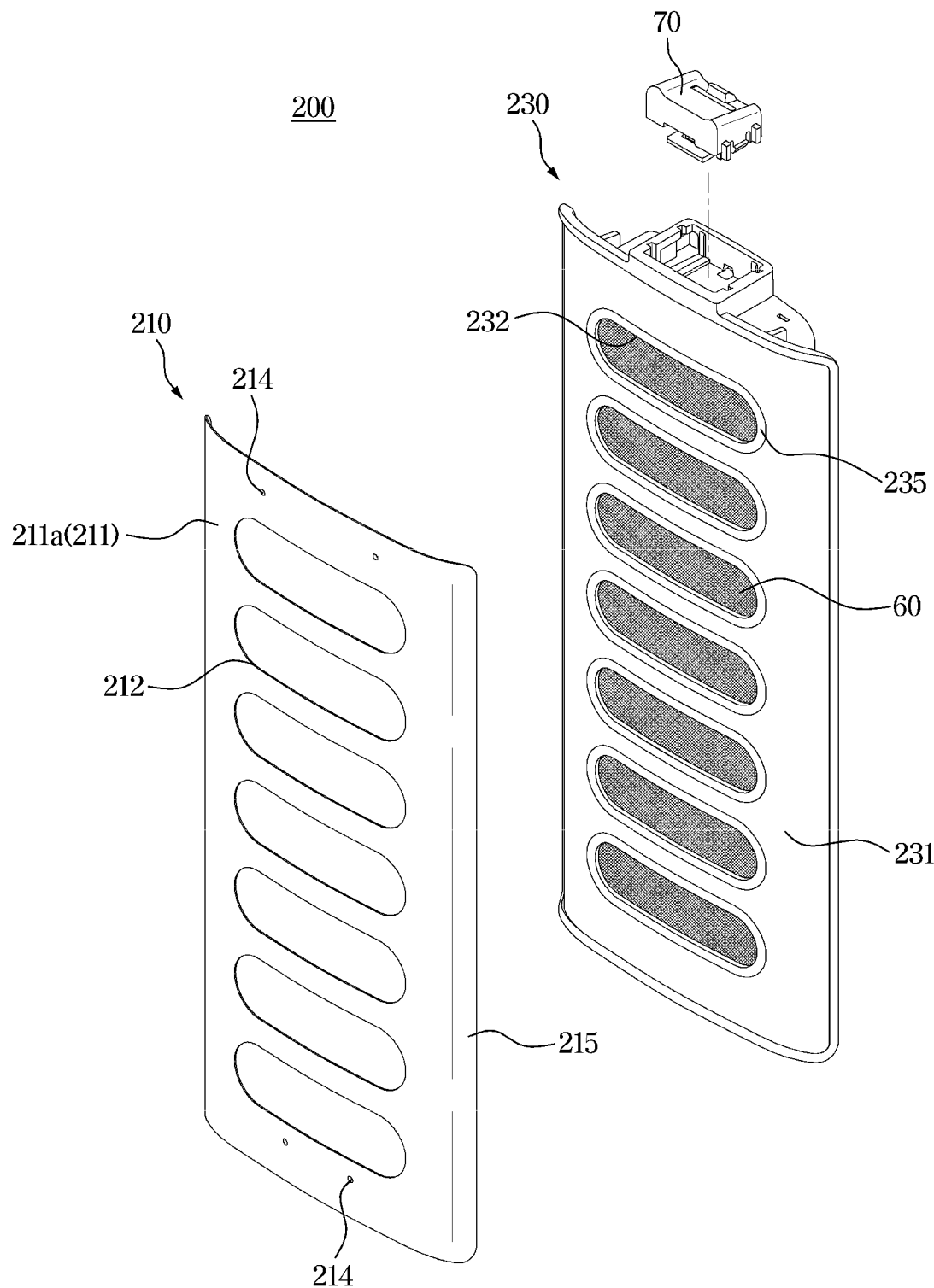
FIG. 10 is an exploded perspective view of the filter device shown in FIG. 9.
Figure 11:
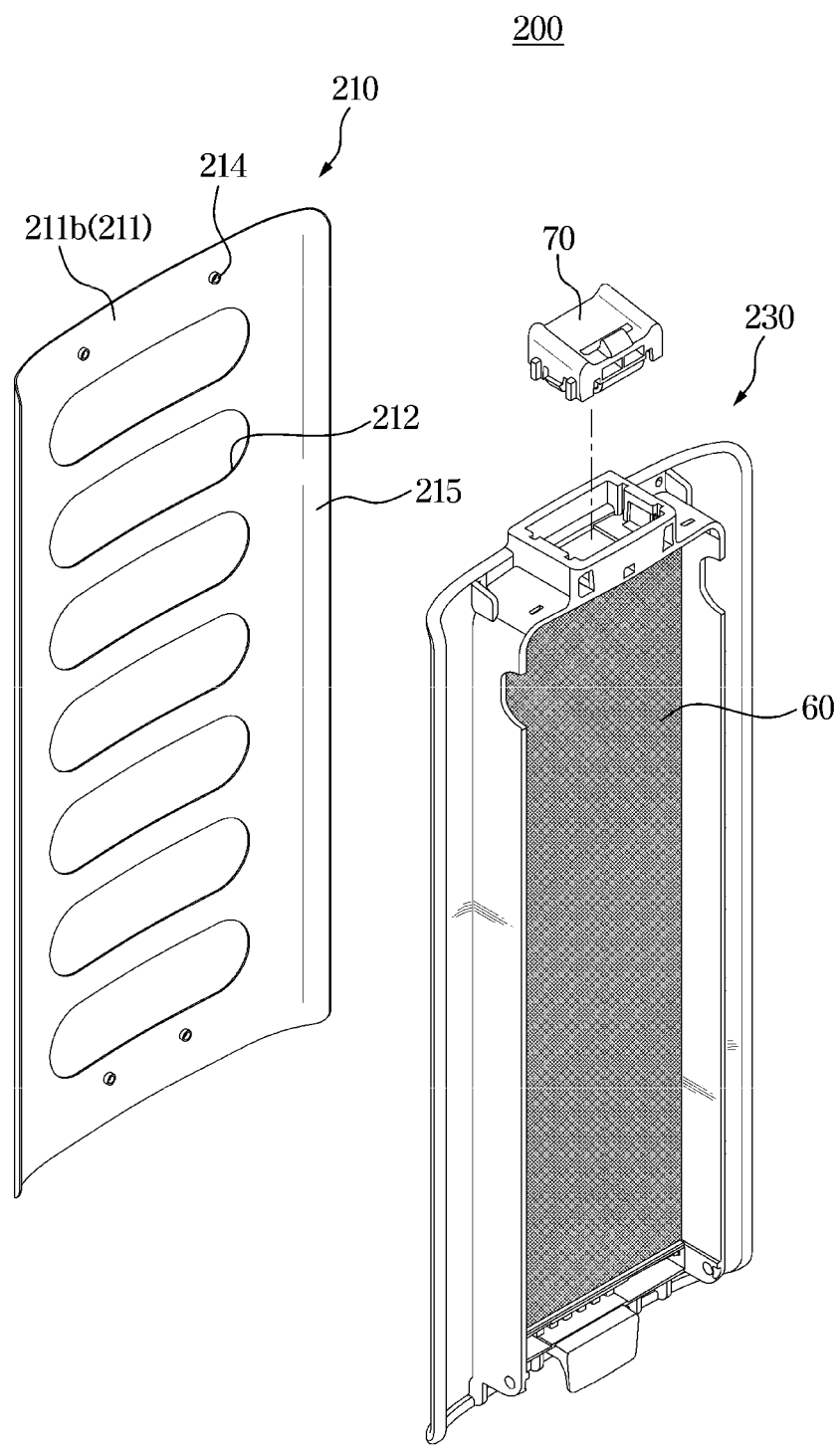
FIG. 11 is an exploded perspective view of the filter device shown in FIG. 10 at another angle.

FIG. 9 is a perspective view illustrating a filter device in a washing machine, according to another embodiment of the present disclosure. FIG. 10 is an exploded perspective view of the filter device shown in FIG. 9. FIG. 11 is an exploded perspective view of the filter device shown in FIG. 10 at another angle.

The same components as those of the above-described embodiment will be referred to with the same reference numerals, and descriptions thereof will be omitted. In FIGS. 9 to 11, only a first cover 210 and a first body 230 according to another embodiment of the present disclosure will be described.

Referring to FIGS. 9 to 11, the washing machine may include a filter device 200. The filter device 200 may be coupled to the inner wall 12*a* of the spin basket 12. The filter device 200 may form a washing water flow path therein, and the washing water flow generated by the pulsator may be introduced into the washing water flow path. The washing water introduced into the washing water flow path may be discharged to the inside of the spin basket 12 through an outlet.

The filter device 200 may include a body 230, a handle, a filter, and a cover 210.

The body 230 may be a first body 230. The first body 230 may be formed by insert injection-molding. Specifically, after the first cover 210 formed of a stainless material is insert-molded, the first body 230 may be injection-molded. Accordingly, a gap may not be generated between the first body 230 and the first cover 210. Accordingly, in the gap between the first body 230 and the first cover 210, foreign substances are prevented from being caught or mold is prevented from being generated.

The first body 230 may include a base 231, a body discharge hole 232, and a protective protrusion 235. The base 231 may form a body of the first body 230.

The body discharge hole 232 may be configured so that washing water is discharged from the base 231. The body discharge hole 232 may be formed so that the washing water is discharged through the washing water flow path and the filter. That is, the body discharge hole 232 may allow the filtered washing water to flow into the inside of the washing basket again through the outlet. A plurality of body discharge holes 232 may be provided along the vertical direction. That is, since the first body 230 is insert injection-molded, the body discharge hole 232 may be provided in a shape corresponding to a cover discharge hole 212.

The protective protrusion 235 may be formed outside the body discharge hole 232. The protective protrusion 235 may protrude toward the first cover 210. When the first cover 210 and the first body 230 are coupled, the protective protrusion 235 may protrude further toward the inside of the spin basket 12 than the first cover 210. Accordingly, the first cover 210 may not be damaged due to clothes during a washing operation, and the protective protrusion 235 may be damaged instead of the first cover 210. Accordingly, it is possible to prevent the first cover 210 from being damaged due to the clothes and to maintain the aesthetics of an exterior of the first cover 210 formed of a stainless material.

The filter device 200 may include a handle 70. The handle 70 may be provided on an upper portion of the first body 230. The first body 230 may be coupled to a case 140. The handle 70 may allow the coupled first body 230 and case 140 to be rotatably coupled to a second body 170. The handle 70 may allow the first body 230 and the case 140 to be removably coupled to the second body 170.

The filter 60 is disposed in the filter device 200 to filter out foreign substances contained in washing water flowing through the filter device 200. The filter 60 may be accommodated in the first body 230 to filter the foreign substances of the washing water. In the embodiment of the present disclosure, the filter 60 may be provided to filter out the foreign substances contained in the washing water when the washing water, which is introduced through the inlet 101, passes through the washing water flow path 103 and is discharged to the spin basket 12 through the outlet 102.

The cover 210 may be the first cover 210. The first cover 210 may include a stainless material. That is, the first cover 210 may be formed of a stainless material. The first body 230 may be formed by insert-molding and then injection-molding the first cover 210.

The first cover 210 may include a cover part 211, the cover discharge hole 212, a cover coupling part 213, a communication hole 214, and a bent part 215.

The cover part 211 may form a portion of the inner circumferential surface of the spin basket 12. That is, the cover part 211 may be provided to cover the first body 230. The cover part 211 may be provided to correspond to the base 231 of the first body 230. The cover part 211 may include a first side 211*a* and a second side 211*b*. The first side 211*a* may be a direction toward the inside of the spin basket 12, and the second side 211*b* may be a direction opposite to the first side 211*a*. That is, the second side 211*b* may be a direction toward the first body 230.

The cover discharge hole 212 may allow washing water to be discharged through the cover 210. That is, the washing water passing through the washing water flow path and the body discharge hole 232 may be introduced into the spin basket 12 through the cover discharge hole 212. That is, the cover discharge hole 212 may allow the filtered washing water to flow into the inside of the washing basket 12 again through the outlet. The cover discharge hole 212 may be formed in the cover part 211. A plurality of cover discharge holes 212 may be provided along the vertical direction. The cover discharge hole 212 may be provided to correspond to the body discharge hole 232.

The communication hole 214 may be formed in at least one of an upper end portion and a lower end portion of the first cover 210. That is, the communication hole 214 may be formed in at least one of an upper end portion and a lower end portion of the cover part 211. The communication hole 214 may allow an injection-molding material forming the first body 230 to flow from the second side 211*b* to the first side 211*a* when the first body 230 is injection-molded. As the injection-molding material flows from the second side 211*b* to the first side 211*a*, the first cover 210 and the first body 230 may be coupled to each other. That is, the injection-molding material flows to the first side 211*a* to form the cover coupling part 213. When the first cover 210 and the first body 230 are coupled, the cover coupling part 213 may block the communication hole 214. The cover coupling part 213 may have a larger area than the communication hole 214. Accordingly, the first cover 210 and the first body 230 may be coupled without separated.

The bent part 215 may be formed by being bent to both sides from the cover part 211 so that the first cover 210 resists the contraction of the first body 230 when the first body 230 is injection-molded. That is, tension may be imparted between the cover part 211 and the bent part 215 to prevent the generation of unevenness of the first cover 210 when the first body 230 is injection-molded.

In addition, the first cover 210 may include at least one fixing hole provided in at least one of an upper side and a lower side to be coupled to a mold during insert injection-molding.

However, the present disclosure is not limited thereto, and the first cover 210 may be attached to the mold by being suctioned into the mold during the insert injection-molding. Accordingly, a separate hole for fixing the first cover 210 to the mold is not required, thereby improving the exterior aesthetics of the first cover 210.

According to an aspect of the present disclosure, provided is a washing machine capable of preventing mold and scale from being generated by removing a separation space between a body and a cover.

Particular embodiments have been illustrated and described above. However, in addition to the embodiments disclosed herein, various changes may be made without departing from the technical concept of the disclosure, and will be construed as being within the scope of the disclosure.

What is claimed is:

1. A washing machine comprising:
   a tub;
   a spin basket rotatably disposed inside the tub;
   a pulsator disposed at a lower portion of the spin basket and configured to generate a flow of washing water; and
   a filter device including:
      a body configured to form a path therein so that the washing water of the flow is introduced into the body, and to which a filter is installable so that while the filter is installed, the washing water introduced into the body is filtered by the filter, the body including;
         a first side facing away from an inner wall;
         a body discharge hole formed in the first side of the body; and
         a second side coupled to the inner wall of the spin basket;
      a cover to cover the first side of the body and to form a portion of an inner circumferential surface of the spin basket, the cover including a cover discharge hole corresponding to the body discharge hole; and
      a sealing member to seal a space between the body and the cover, the sealing member including a hole corresponding to the body discharge hole and the cover discharge hole so that the washing water flowed through the path is discharged into the spin basket through the body discharge hole, the cover discharge hole, and the hole.

2. The washing machine of claim 1, wherein the body includes an edge protrusion protruding at least either upward or downward from an edge portion of the body, and the sealing member includes a recessed part recessed inward from an outer periphery of the sealing member so as to correspond to the edge protrusion.

3. The washing machine of claim 2, wherein the edge protrusion includes a first edge protrusion protruding upward from a lower edge of the body, and a second edge protrusion protruding downward from an upper edge of the body.

4. The washing machine of claim 1, wherein the sealing member includes a coupling protrusion protruding toward the body from an outer periphery of the sealing member so as to be coupled to the body, and the body includes a coupling hole formed to correspond to the coupling protrusion so that the coupling protrusion is inserted into the coupling hole.

5. The washing machine of claim 1, wherein the cover includes a forming rib protruding toward the sealing member and forming the cover discharge hole, and the forming rib is disposed in the hole of the sealing member sealing a space between the cover and the sealing member.

6. The washing machine of claim 1, wherein the body includes a protective protrusion forming the body discharge hole and protruding closer to an inside of the spin basket than the cover to protect the cover from clothes.

7. The washing machine of claim 1, wherein the body discharge hole is smaller than the cover discharge hole and the hole of the sealing member.

8. The washing machine of claim 1, wherein the hole of the sealing member is larger than the cover discharge hole and the body discharge hole.

9. The washing machine of claim 1, wherein the filter device includes an inlet through which the washing water is introduced.

10. The washing machine of claim 1, wherein the body is injection-molded after the cover is insert-molded, and the cover includes a communication hole through which an injection-molding material which formed the body flowed so as to be coupled to the body.

11. The washing machine of claim 10, wherein the cover includes a first side facing an inside of the spin basket and a second side facing a direction opposite to the first side, and the injection-molding material which formed the body flowed from the second side to the first side through the communication hole.

12. A washing machine comprising:
    a tub;
    a spin basket rotatably disposed inside the tub;
    a pulsator disposed at a lower portion of the spin basket and configured to generate a flow of washing water; and
    a filter device including:
       a body configured to form a path therein so that the washing water of the flow is introduced into the body, and to which a filter is installable so that while the filter is installed, the washing water introduced into the body is filtered by the filter, the body including;
          a first body having a first side facing away from an inner wall; and
          a second body having a second side coupled to the inner wall of the spin basket;
       a first cover to cover the first side of the first body;
       a second cover disposed between the first body and to cover the second body;
       form a portion of an inner circumferential surface of the spin basket; and
       a first sealing member to seal a space between the first cover and the first body; and
       a second sealing member to seal a space between the second cover and the second body.

13. The washing machine of claim 12, wherein the second sealing member is injection-molded after the second body is injection-molded or insert-molded.

14. The washing machine of claim 13, wherein the second sealing member is injection molded after the second body is insert-molded, and the second body includes a communication hole through which an injection-molding material which formed the second sealing member flowed so as to be coupled to the second sealing member.

15. The washing machine of claim 14, wherein the second body further includes a third side facing the second sealing member, and the injection-molding material which formed the second sealing member flowed from the third side to the second side through the communication hole to couple the second sealing member to the second body.

16. The washing machine of claim 14, wherein the second body includes an opening and is coupled to the first body, and the communication hole of the second body is formed at an outer periphery of the opening of the second body.

* * * * *